J. R. DAVIS.
Corn-Planter.
No. 47,622.
Patented May 9, 1865.
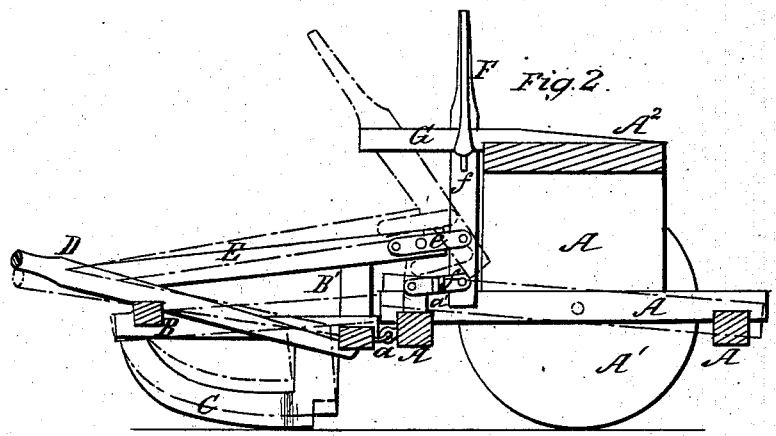
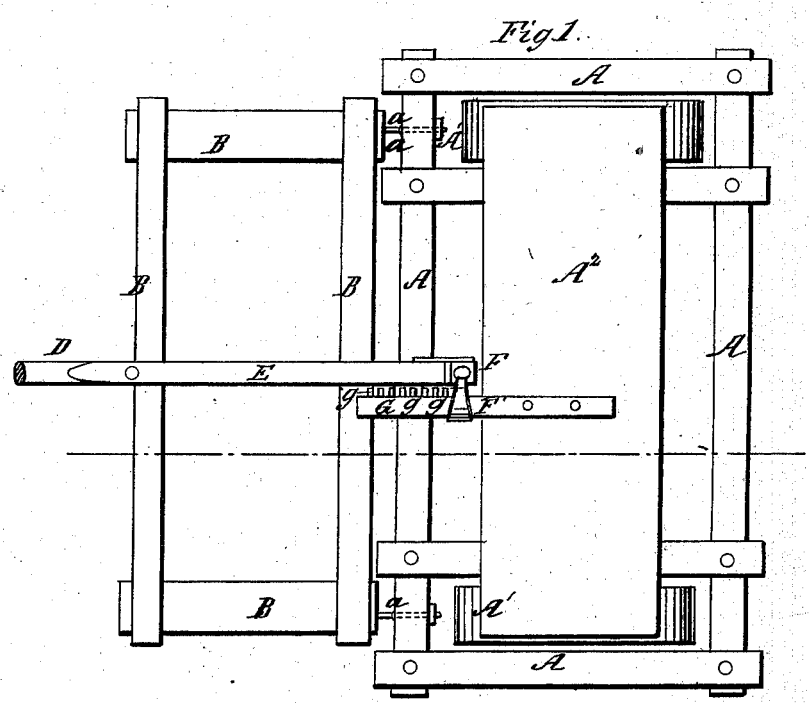

UNITED STATES PATENT OFFICE.

JOHN R. DAVIS, OF BLOOMFIELD, IOWA.

CORN-PLANTER.

Specification forming part of Letters Patent No. 47,622, dated May 9, 1865.

*To all whom it may concern:*

Be it known that I, JOHN R. DAVIS, of Bloomfield, in the county of Davis and State of Iowa, have invented a new and Improved Corn-Planter; and I do hereby declare the following to be a full and exact description of the same, reference being had to the accompanying drawings, making part of this specification, in which—

Figure 1 is a plan or top view of my improved corn-planter. Fig. 2 is a vertical longitudinal section of the same in the line $x\,x$, Fig. 1.

Similar letters of reference indicate corresponding parts in the several figures.

The object of this invention is to produce a novel, cheap, and simplified contrivance, whereby the runners of a corn-planter may be more readily adjusted to work at any desired depth, raised or lowered at will, and retained in either condition, so as to adapt the machine for operation or for the suspension thereof.

The invention consists in the employment of a lever which has its fulcrum on the main frame, and which is jointed to an arm or secondary lever, which is rigidly secured upon a pivoted frame, to which the runners or furrow-shares are attached, the first-mentioned lever being furnished with a spring which operates in connection with a horizontal bar provided with a series of pins or projections, so as to retain the lever in any position to which it may be turned, as will be hereinafter fully explained.

In order that others skilled in the art to which my invention appertains may be enabled to fully understand and use the same, I will proceed to describe its construction and operation.

In the accompanying drawings, A may represent various parts of a strong frame, which is mounted upon wheels or drums A' A', and which supports a seat, A².

B may represent the several parts of a frame, which is attached to the frame A by joints or links $a\,a$, which permit the frames A B to have their relative positions varied, for the purpose to be hereinafter explained.

C may represent the furrow-shares or runners, secured respectively to the opposite sides of the frame B, and adapted to move simultaneously therewith.

D represents the draft tongue or pole, supported upon the frame B in the manner shown.

E is a lever or arm, which is rigidly joined at its front end to the tongue D, and which extends backward in an upwardly-inclined position as far as the frame A, the post B' providing a firm intermediate support. The rear end of the lever E constitutes the point of action for a lever, F, which is pivoted to said lever E by links $e$. The lever F is attached by links $f$ to a small rigid block or post, $a'$, upon the front part of the frame.

$f'$ represents a check or catch secured to the side of the lever F, and which may be retained between the pins or projections $g$ by means of a spring, F', attached to the upper end of the lever F by rivets or otherwise. The pins or projections $g$ are ranged upon an arm, G, which is secured to and projects forward from the driver's seat A².

The operation of the machine will be readily understood from the foregoing description.

When it is desired to raise the runners C out of contact with the ground, in order to adapt the machine to be more readily turned or entirely suspend the operation, this can be done by merely turning forward the lever F, which the driver, sitting upon his seat A², can perform with little exertion and without changing the normal position of his body. The lever F on being turned forward has its fulcrum at the rear end of the arm or lever E and its point of action at the front end of the frame A, which, being turned up, also elevates the rear end of the frame B, thereby raising the runners out of contact with the ground.

It will be seen that when the runners are thus elevated the entire machine is supported by the wheels A' A' and the neck-yokes, to which the tongue D is attached. To lower the runners to their working position it is only necessary for the driver to impart a slight lateral movement to the lever F, so as to release the catch $f'$ from the pins $g$, when the natural tendency of the parts will cause them to assume their working position. The red lines in Fig. 2 indicate the relative positions which the two frames A B occupy when the runners are elevated.

It is manifest that the projections $g$ and catch $f$ enable the operator to regulate with facility the depth at which it may be desired to work the runners. Any suitable dropping apparatus may be employed.

This implement is of such simple construction and operation as to render needless any further description.

Having thus described my invention, the following is what I claim therein as new and desire to secure by Letters Patent:

In combination with the wheel-frame A, runner-frame B, rigid tongue D, and rigid lever E, the lever F, fulcrumed by the link $e$ to the rigid lever E, connected loosely at its lower end to the frame A by the link $f$, and held at its upper end by the notched bar G $g$, spring F', and catch $f$, all the said parts being constructed and arranged to operate in the manner and for the purposes herein specified.

JOHN R. DAVIS.

Witnesses:
W. A. SHELTON,
A. J. AUGDEN.